(12) United States Patent  
Perkinson et al.

(10) Patent No.: US 11,715,948 B2
(45) Date of Patent: Aug. 1, 2023

(54) FAULT-TOLERANT POWER DISTRIBUTION IN A VEHICLE

(71) Applicant: Aurora Flight Sciences Corporation, a subsidiary of The Boeing Company, Manassas, VA (US)

(72) Inventors: James Perkinson, Winchester, MA (US); Andrew S. Babel, Somerville, MA (US); Robert J. Atmur, Whittier, CA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/455,612

(22) Filed: Nov. 18, 2021

(65) Prior Publication Data

US 2022/0255316 A1  Aug. 11, 2022

Related U.S. Application Data

(60) Provisional application No. 63/147,535, filed on Feb. 9, 2021.

(51) Int. Cl.
*H02J 1/12* (2006.01)
*B64D 27/24* (2006.01)

(52) U.S. Cl.
CPC ............. *H02J 1/12* (2013.01); *B64D 27/24* (2013.01); *B60L 2200/10* (2013.01); *B64D 2221/00* (2013.01); *H02J 2310/44* (2020.01)

(58) Field of Classification Search
CPC ........ H02J 1/12; H02J 2310/44; B64D 27/24; B64D 2221/00; B64D 31/14; B64D 35/02;

(Continued)

(56) References Cited

U.S. PATENT DOCUMENTS

| 8,928,292 | B2 | 1/2015 | Thaxton et al. |
| 2010/0127665 | A1* | 5/2010 | Mitsutani ............... B60L 53/20 320/137 |
| 2011/0273136 | A1* | 11/2011 | Yoshimoto ............... B60L 53/14 320/103 |

FOREIGN PATENT DOCUMENTS

| EP | 3 213 952 A1 | 9/2017 |
| EP | 3 296 212 A1 | 3/2018 |

(Continued)

OTHER PUBLICATIONS

Buticchi, G., et al. Multiport DC/DC Converters for the More Electric Aircraft. Power Electronics Machines and Control Group, CSAA/IET International Conference on Aircraft Utility Systems (AUS 2018), 2018. <DOI: 10.1049/cp.2018.0150>.

(Continued)

*Primary Examiner* — Lincoln D Donovan
*Assistant Examiner* — Alex W Lam
(74) *Attorney, Agent, or Firm* — Womble Bond Dickinson (US) LLP

(57) ABSTRACT

A vehicle is provided that includes a basic structure; and coupled to the basic structure, power sources, a propulsion system and power distribution circuitry. The propulsion system includes a plurality of electric motors configured to power propulsors to generate propulsive forces that cause the vehicle to move. The power distribution circuitry is configured to deliver DC electric power from the power sources to the electric motors, the power distribution circuitry including a plurality of DC-to-DC converter assemblies configured to input the DC electric power from the power sources and deliver voltage-regulated outputs to the electric motors, a DC-to-DC converter assembly operatively coupled to multiple ones of the power sources and multiple ones of the electric motors, and the DC-to-DC converter (Continued)

assembly including a multiple-input and multiple-output (MIMO) transformer with a single transformer core.

32 Claims, 16 Drawing Sheets

(58) Field of Classification Search
CPC ............... B60L 2200/10; B60L 3/0046; B60L 2220/42; B60L 3/0092; B60L 3/003; Y02T 10/70; Y02T 10/7072; Y02T 10/72; Y02T 50/60; H01F 27/38; H01F 30/04; H01F 30/06; H02M 3/003; H02M 3/33573; H02M 3/33584; H02M 3/33592; B64C 27/08; H02P 5/00; H02P 25/22; H02P 29/025
See application file for complete search history.

(56) References Cited

FOREIGN PATENT DOCUMENTS

| | | |
|---|---|---|
| EP | 3 723 267 A1 | 10/2020 |
| WO | 2018/202462 A1 | 11/2018 |

OTHER PUBLICATIONS

Extended European Search Report in the corresponding European Application No. 21210677.7, dated May 13, 2022. 9 pages.

* cited by examiner

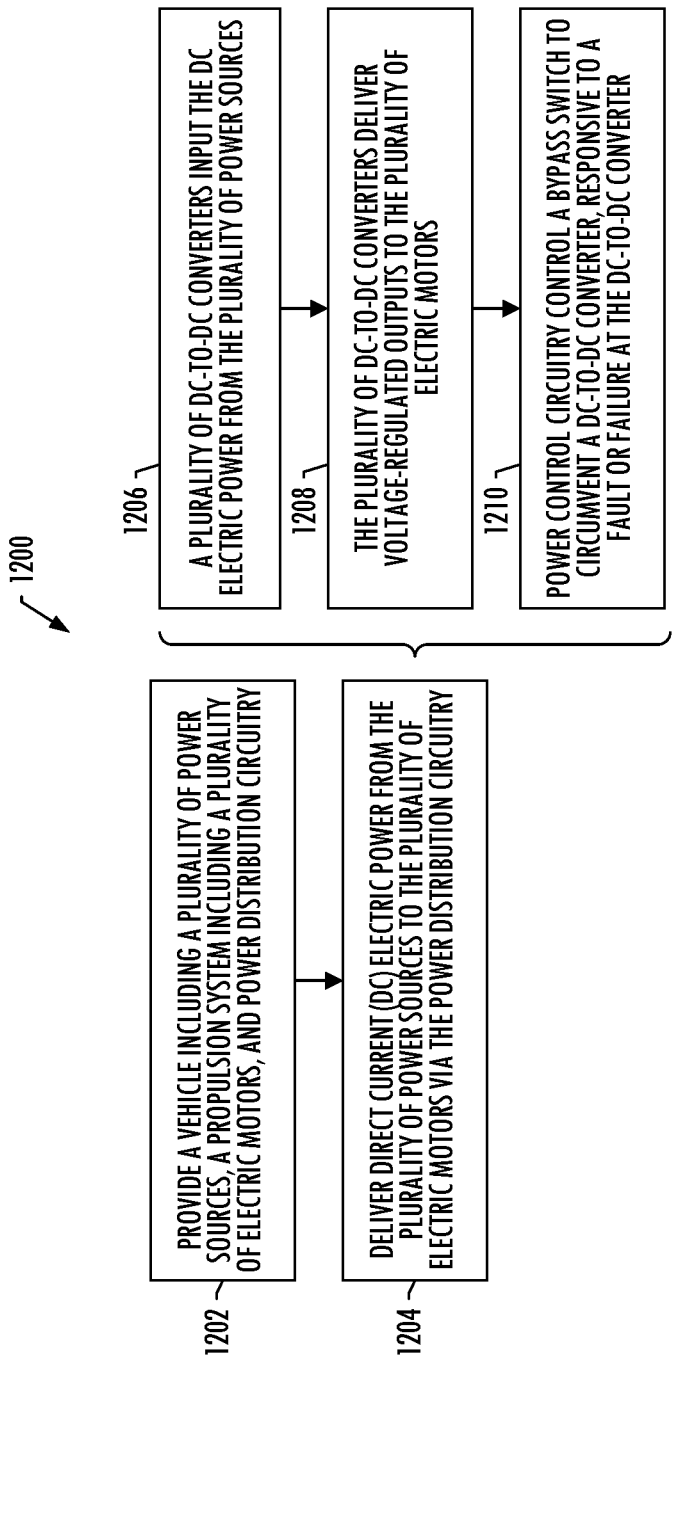

FAULT-TOLERANT POWER DISTRIBUTION IN A VEHICLE

CROSS-REFERENCE TO RELATED APPLICATION(S)

This application claims priority to U.S. Provisional Application No. 63/147,535, filed Feb. 9, 2021, entitled FAULT-TOLERANT POWER DISTRIBUTION IN A VEHICLE, the content of which is incorporated herein by reference in its entirety.

TECHNOLOGICAL FIELD

The present disclosure relates generally to electric power distribution and, in particular, to electric power distribution in electrically-powered systems such as those onboard vehicles.

BACKGROUND

Electric and hybrid vehicles such as aerial vehicles, road vehicles and the like are powered by sources of electric power such as batteries. These vehicles generally include one or more power sources, and a propulsion system one or more electric motors configured to power one or more propulsors to generate propulsive forces that cause the vehicle to move. Depending on the vehicle, these propulsors may include rotors, propellers, wheels and the like. The propulsion system may also include a drivetrain configured to deliver power from the electric motors to the propulsors; and for some vehicles, the electric motors and drivetrain may in some contexts be referred to as the powertrain of the vehicle.

In many of these vehicles, electric power from the power sources is distributed to the electric motors with direct connections between the power sources and the electric motors, with fusing for protection and contactors and pre-charge circuits for control and startup. Existing isolated DC-to-DC converters in more general applications commonly have transformers with either one input and one output or one input and multiple outputs. When placed between sources and loads, isolated DC-to-DC converters can provide an electric power system with a number of benefits including galvanic isolation, the ability to generate a bipolar DC bus at the output, and a fixed regulated output voltage.

Although existing power distribution designs are adequate, it is generally desirable to improve on existing designs.

BRIEF SUMMARY

Example implementations of the present disclosure are directed to electric power distribution and, in particular, to electric power distribution in electrically-powered systems such as those onboard vehicles. Some example implementations provide more reliable power distribution by allowing multiple power sources to provide electric power to multiple electric motors while maintaining the benefits of an isolated converter-based power system. Some of these examples include an assembly of multiple DC-to-DC converters that share a multiple-input and multiple-output (MIMO) transformer, single transformer core, which may provide magnetic coupling between the DC-to-DC converters. Example implementations may replace fuses, contactors and pre-charge circuits with an active converter, namely, a DC-to-DC converter assembly with a MIMO transformer.

Reliability is often a key goal of power distribution in vehicles, and many vehicles achieve reliability through redundancy. In some example implementations, power distribution is made more reliable, not by duplication, but by having a DC-to-DC converter assembly in which multiple inputs and multiple outputs are integrated on a single transformer core. The transformer core tends to be a dominant mass of any DC-to-DC system, and example implementations may allow the transformer core to provide additional functionality without additional mass.

Some example implementations include bypass switches to circumvent a DC-to-DC converter, responsive to a fault or failure at the DC-to-DC converter. This accommodates single points of faults or failures in the power distribution. In particular instances in which the power sources have a voltage range compatible with the electric motors, a bypass switch may be employed to directly connect a power source to an electric motor, circumventing a faulted or failed DC-to-DC converter. In this case, the power distribution may be made more reliable, not by duplication, but by having a bypass switch that can functionally (with less optimality) circumvent the converter with little weight.

The present disclosure thus includes, without limitation, the following example implementations.

Some example implementations provide a vehicle comprising: a basic structure; and coupled to the basic structure, a plurality of power sources; a propulsion system including a plurality of electric motors configured to power a plurality of propulsors to generate propulsive forces that cause the vehicle to move; and power distribution circuitry configured to deliver direct current (DC) electric power from the plurality of power sources to the plurality of electric motors, the power distribution circuitry including a plurality of DC-to-DC converter assemblies configured to input the DC electric power from the plurality of power sources and deliver voltage-regulated outputs to the plurality of electric motors, a DC-to-DC converter assembly operatively coupled to multiple ones of the plurality of power sources and multiple ones of the plurality of electric motors, and the DC-to-DC converter assembly including a multiple-input and multiple-output (MIMO) transformer with a single transformer core.

In some example implementations of the vehicle of any preceding example implementation, or any combination of any preceding example implementations, the plurality of propulsors include one or more of rotors, propellers or wheels.

In some example implementations of the vehicle of any preceding example implementation, or any combination of any preceding example implementations, the MIMO transformer further includes multiple primary coils and multiple secondary coils wound around the single transformer core, and isolated from one another but magnetically coupled by the single transformer core.

In some example implementations of the vehicle of any preceding example implementation, or any combination of any preceding example implementations, the DC-to-DC converter assembly further includes a plurality of high-frequency power converters including a first multiple high-frequency power converters coupled to respective ones of the multiple primary coils of the MIMO transformer, and a second multiple high-frequency power converters coupled to respective ones of the secondary coils of the MIMO transformer.

In some example implementations of the vehicle of any preceding example implementation, or any combination of any preceding example implementations, at least some of the plurality of high-frequency power converters include bridge circuits with respective switches, and wherein the power distribution circuitry further includes power control circuitry configured to control the respective switches to thereby control power flow through the DC-to-DC converter assembly, and manage magnetic flux through the single transformer core.

In some example implementations of the vehicle of any preceding example implementation, or any combination of any preceding example implementations, the power control circuitry is configured to control the respective switches to synchronize the power flow through the DC-to-DC converter assembly.

In some example implementations of the vehicle of any preceding example implementation, or any combination of any preceding example implementations, the power control circuitry is configured to control the respective switches to control different amounts of power through the DC-to-DC converter assembly simultaneously.

In some example implementations of the vehicle of any preceding example implementation, or any combination of any preceding example implementations, the power control circuitry is further configured to control the respective switches of one or more of the high-frequency power converters to compensate for a fault or failure at one of the high-frequency power converters, or a fault or failure at one of the multiple ones of the plurality of power sources operatively coupled to the DC-to-DC converter assembly.

In some example implementations of the vehicle of any preceding example implementation, or any combination of any preceding example implementations, each electric motor has dual armature windings driven by dual, independent motor drives to develop a magnetic field to provide torque to rotate a motor shaft that causes a respective one of the plurality of propulsors to generate a propulsive force, and the DC-to-DC converter assembly includes at least: a first DC-to-DC converter configured to deliver first voltage-regulated outputs to a first of the dual, independent motor drives and thereby a first of the dual armature windings of a first and a second of the plurality of electric motors; and a second DC-to-DC converter configured to deliver second voltage-regulated outputs to a second of the dual, independent motor drives and thereby a second of the dual armature windings of the first and the second of the electric motors.

In some example implementations of the vehicle of any preceding example implementation, or any combination of any preceding example implementations, the first DC-to-DC converter is configured to input the DC electric power from a first and a second of the plurality of power sources, and the second DC-to-DC converter is configured to input the DC electric power from a third and a fourth of the plurality of power sources.

In some example implementations of the vehicle of any preceding example implementation, or any combination of any preceding example implementations, the first DC-to-DC converter is configured to input the DC electric power from a first and a second of the plurality of power sources, and the second DC-to-DC converter is configured to input the DC electric power from the first or the second of the plurality of power sources, and a third of the plurality of power sources.

Some example implementations provide a managing power in a vehicle, the method comprising: providing the vehicle including a plurality of power sources, a propulsion system including a plurality of electric motors configured to power a plurality of propulsors to generate propulsive forces that cause the vehicle to move, and power distribution circuitry electrically coupling the plurality of power sources to the plurality of propulsors; and delivering direct current (DC) electric power from the plurality of power sources to the plurality of electric motors via the power distribution circuitry that includes a plurality of DC-to-DC converter assemblies inputting the DC electric power from the plurality of power sources and delivering voltage-regulated outputs to the plurality of electric motors, a DC-to-DC converter assembly operatively coupled to multiple ones of the plurality of power sources and multiple ones of the plurality of electric motors, and the DC-to-DC converter assembly including a multiple-input and multiple-output (MIMO) transformer with a single transformer core.

In some example implementations of the method of any preceding example implementation, or any combination of any preceding example implementations, providing the vehicle includes providing the vehicle in which the MIMO transformer further includes multiple primary coils and multiple secondary coils wound around the single transformer core, and isolated from one another but magnetically coupled by the single transformer core.

In some example implementations of the method of any preceding example implementation, or any combination of any preceding example implementations, providing the vehicle includes providing the vehicle in which the DC-to-DC converter assembly further includes a plurality of high-frequency power converters including a first multiple high-frequency power converters coupled to respective ones of the multiple primary coils of the MIMO transformer, and a second multiple high-frequency power converters coupled to respective ones of the secondary coils of the MIMO transformer.

In some example implementations of the method of any preceding example implementation, or any combination of any preceding example implementations, providing the vehicle includes providing the vehicle in which at least some of the plurality of high-frequency power converters include bridge circuits with respective switches, and wherein the power distribution circuitry further includes power control circuitry, and the method further comprises the power control circuitry controlling the respective switches to thereby control power flow through the DC-to-DC converter assembly, and manage magnetic flux through the single transformer core.

In some example implementations of the method of any preceding example implementation, or any combination of any preceding example implementations, controlling the respective switches includes the power control circuitry controlling the respective switches to synchronize the power flow through the DC-to-DC converter assembly.

In some example implementations of the method of any preceding example implementation, or any combination of any preceding example implementations, controlling the respective switches includes the power control circuitry controlling the respective switches to control different amounts of power through the DC-to-DC converter assembly simultaneously.

In some example implementations of the method of any preceding example implementation, or any combination of any preceding example implementations, the method further comprises the power control circuitry controlling the respective switches of one or more of the high-frequency power converters to compensate for a fault or failure at one of the high-frequency power converters, or a fault or failure at one of the multiple ones of the plurality of power sources operatively coupled to the DC-to-DC converter assembly.

In some example implementations of the method of any preceding example implementation, or any combination of any preceding example implementations, each electric motor has dual armature windings driven by dual, independent motor drives to develop a magnetic field to provide torque to rotate a motor shaft that causes a respective one of the plurality of propulsors to generate a propulsive force, and the DC-to-DC converter assembly delivering the voltage-regulated outputs includes at least: a first DC-to-DC converter delivering first voltage-regulated outputs to a first of the dual, independent motor drives and thereby a first of the dual armature windings of a first and a second of the plurality of electric motors; and a second DC-to-DC converter delivering second voltage-regulated outputs to a second of the dual, independent motor drives and thereby a second of the dual armature windings of the first and the second of the electric motors.

In some example implementations of the method of any preceding example implementation, or any combination of any preceding example implementations, the first DC-to-DC converter inputs the DC electric power from a first and a second of the plurality of power sources, and the second DC-to-DC converter inputs the DC electric power from a third and a fourth of the plurality of power sources.

In some example implementations of the method of any preceding example implementation, or any combination of any preceding example implementations, the first DC-to-DC converter assembly inputs the DC electric power from a first and a second of the plurality of power sources, and the second DC-to-DC converter assembly inputs the DC electric power from the first or the second of the plurality of power sources, and a third of the plurality of power sources.

Some example implementations provide a vehicle comprising: a basic structure; and coupled to the basic structure, a plurality of power sources; a propulsion system including a plurality of electric motors configured to power a plurality of propulsors to generate propulsive forces that cause the vehicle to move; and power distribution circuitry configured to deliver direct current (DC) electric power from the plurality of power sources to the plurality of electric motors, the power distribution circuitry including: a plurality of DC-to-DC converters configured to input the DC electric power from the plurality of power sources and deliver voltage-regulated outputs to the plurality of electric motors; a plurality of bypass switches connected in parallel with respective ones of the plurality of DC-to-DC converters; and power control circuitry configured to control a bypass switch to circumvent a DC-to-DC converter, responsive to a fault or failure at the DC-to-DC converter.

In some example implementations of the vehicle of any preceding example implementation, or any combination of any preceding example implementations, the plurality of propulsors include one or more of rotors, propellers or wheels.

In some example implementations of the vehicle of any preceding example implementation, or any combination of any preceding example implementations, the DC-to-DC converter includes: a transformer including a primary coil and a secondary coil wound around a transformer core, and isolated from one another but magnetically coupled by the transformer core; and a plurality of high-frequency power converters including a first high-frequency power converter coupled to the primary coil of the transformer, and a second high-frequency power converter coupled to the secondary coil of the transformer.

In some example implementations of the vehicle of any preceding example implementation, or any combination of any preceding example implementations, the DC-to-DC converter has inputs including a positive input and a negative input, and outputs including a positive output and a negative output, and the bypass switch includes a single pole switch pair that connects the positive input to the positive output, and connects the negative input to the negative output.

In some example implementations of the vehicle of any preceding example implementation, or any combination of any preceding example implementations, the DC-to-DC converter has inputs including a positive input and a negative input, and outputs including a positive output and a negative output, and the bypass switch includes a double pole switch that connects the positive input to the positive output, and connects the negative input to the negative output.

In some example implementations of the vehicle of any preceding example implementation, or any combination of any preceding example implementations, each electric motor has dual armature windings driven by dual, independent motor drives to develop a magnetic field to provide torque to rotate a motor shaft that causes a respective one of the plurality of propulsors to generate a propulsive force, and each of the dual, independent motor drives and thereby the dual armature windings of an electric motor is powered from a different one of the plurality of power sources.

Some example implementations provide a managing power in a vehicle, the method comprising: providing the vehicle including a plurality of power sources, a propulsion system including a plurality of electric motors configured to power a plurality of propulsors to generate propulsive forces that cause the vehicle to move, and power distribution circuitry electrically coupling the plurality of power sources to the plurality of propulsors; and delivering direct current (DC) electric power from the plurality of power sources to the plurality of electric motors via the power distribution circuitry that includes: a plurality of DC-to-DC converters inputting the DC electric power from the plurality of power sources and delivering voltage-regulated outputs to the plurality of electric motors; a plurality of bypass switches connected in parallel with respective ones of the plurality of DC-to-DC converters; and power control circuitry controlling a bypass switch to circumvent a DC-to-DC converter, responsive to a fault or failure at the DC-to-DC converter.

In some example implementations of the method of any preceding example implementation, or any combination of any preceding example implementations, providing the vehicle includes providing the vehicle in which the DC-to-DC converter includes: a transformer including a primary coil and a secondary coil wound around a transformer core, and isolated from one another but magnetically coupled by the transformer core; and a plurality of high-frequency power converters including a first high-frequency power converter coupled to the primary coil of the transformer, and a second high-frequency power converter coupled to the secondary coil of the transformer.

In some example implementations of the method of any preceding example implementation, or any combination of any preceding example implementations, providing the vehicle includes providing the vehicle in which the DC-to-DC converter has inputs including a positive input and a negative input, and outputs including a positive output and a negative output, and the bypass switch includes a single pole switch pair that connects the positive input to the positive output, and connects the negative input to the negative output.

In some example implementations of the method of any preceding example implementation, or any combination of any preceding example implementations, providing the vehicle includes providing the vehicle in which the DC-to-DC converter has inputs including a positive input and a negative input, and outputs including a positive output and a negative output, and the bypass switch includes a double pole switch that connects the positive input to the positive output, and connects the negative input to the negative output.

In some example implementations of the method of any preceding example implementation, or any combination of any preceding example implementations, providing the vehicle includes providing the vehicle in which each electric motor has dual armature windings driven by dual, independent motor drives to develop a magnetic field to provide torque to rotate a motor shaft that causes a respective one of the plurality of propulsors to generate a propulsive force, and each of the dual, independent motor drives and thereby the dual armature windings of an electric motor is powered from a different one of the plurality of power sources.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 12A, 12B, 12C, 12D and 12E are also flowcharts illustrating various steps in a method of managing power in a vehicle, according to various example implementations.

DETAILED DESCRIPTION

Figure 1A:
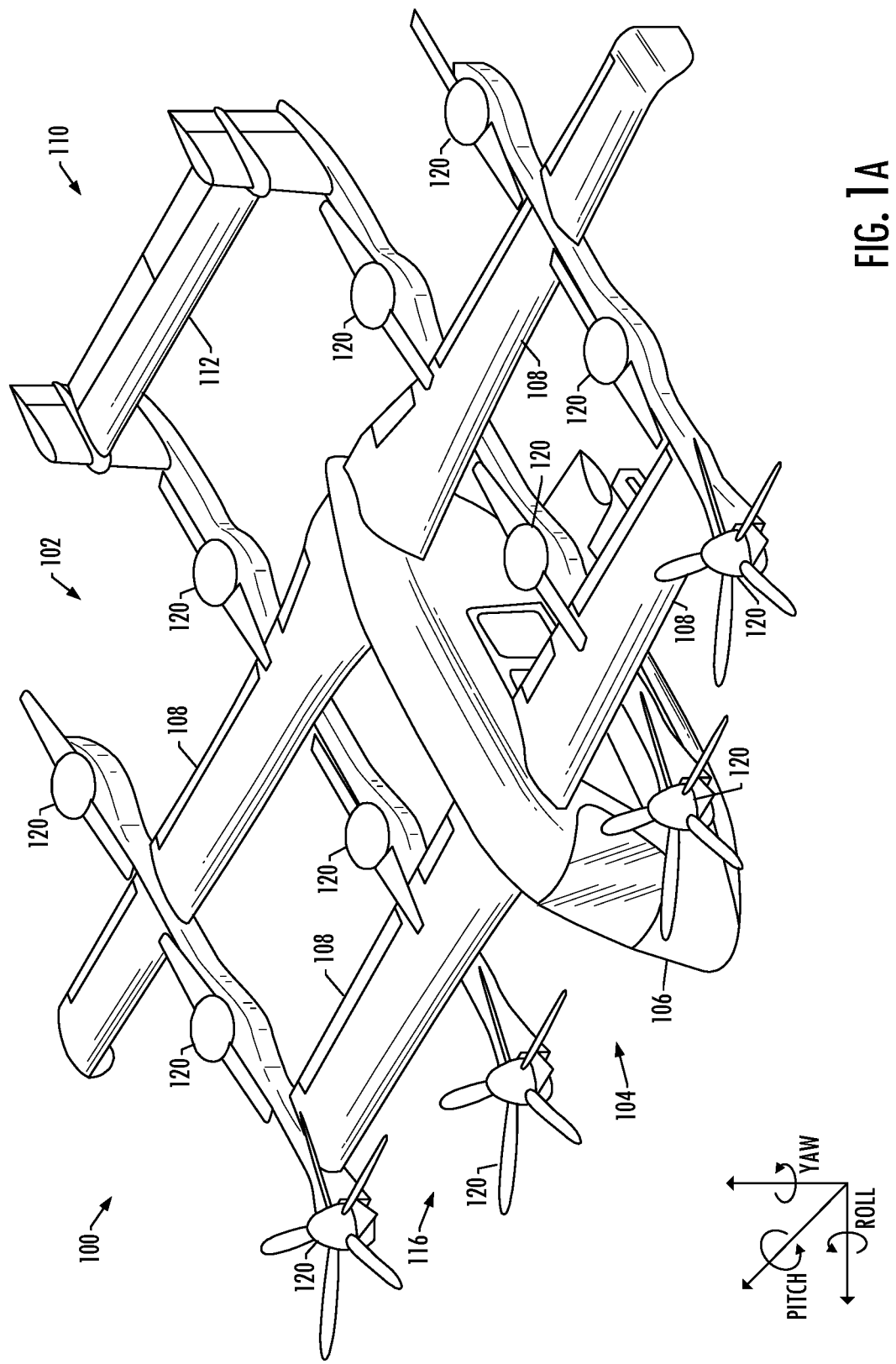
FIGS. 1A and 1B illustrate one type of vehicle, namely, an aircraft, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to electric power distribution and, in particular, to electric power distribution in electrically-powered systems such as those onboard vehicles. As used herein, a vehicle is a machine designed as an instrument of conveyance by land, water or air. A vehicle designed and configurable to fly may at times be referred to as an aerial vehicle or aircraft. A vehicle designed and configurable to operate with at least some level of autonomy may at times be referred to as an autonomous vehicle, or an autonomous aerial vehicle or aircraft in the case of an autonomous vehicle that is also designed and configurable to fly. Other examples of suitable vehicles include a variety of road vehicles, railed vehicles, watercraft (surface vessels, underwater vessels), amphibious vehicles, spacecraft and the like. In some examples, the vehicle is an electric vehicle such as an electric road or rail vehicle, an electric aircraft, an electric spacecraft or the like.

The vehicle may be manned or unmanned. The vehicle may be fully human-controlled, or the vehicle may be semi-autonomous or autonomous in which at least some of its maneuvers are executed independent of or with minimal human intervention. In some examples, the vehicle is operable in various modes with various amounts of human control.

A vehicle generally includes a basic structure; and coupled to the basic structure, a power source, power distribution circuitry and a propulsion system. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The power source is a source of power such as electric power from which the vehicle is powered to move; and in some examples, the vehicle includes multiple or a plurality of power sources. Examples of suitable power sources include batteries, solar panels, fuel cells, electric generators and the like. The power distribution circuitry includes power transmission lines, power electronics and other circuitry for distribution of power from the power source to an electrical load such as the propulsion system and other onboard electronics.

The propulsion system includes one or more electric motors configured to power one or more propulsors to generate propulsive forces that cause the vehicle to move. Although not separately shown, in some examples, one or more motor controllers may be included to coordinate performance of the one or more electric motors. A propulsor is any of a number of different means of converting power into a propulsive force. Examples of suitable propulsors include rotors, propellers, wheels and the like. In some examples, the propulsion system includes a drivetrain configured to deliver power from the electric motors to the propulsors. The electric motors and drivetrain may in some contexts be referred to as the powertrain of the vehicle.

The vehicle may also include any of a number of other systems, subsystems, components and the like. In particular, for example, the vehicle may include a vehicle management system (VMS). The VMS is a vehicle-specific subsystem configured to manage subsystems and other components of the vehicle. These subsystems and other components include, for example, maneuver controls, landing gear, onboard environmental systems, electrical, pneumatic and hydraulic systems, communications systems, navigation systems and other subsystems and components for controlling operation and maneuvering of the vehicle. The VMS is configured to accept maneuver commands such as waypoints and/or steering commands, and control the vehicle to follow those maneuver commands.

Figure 1B:
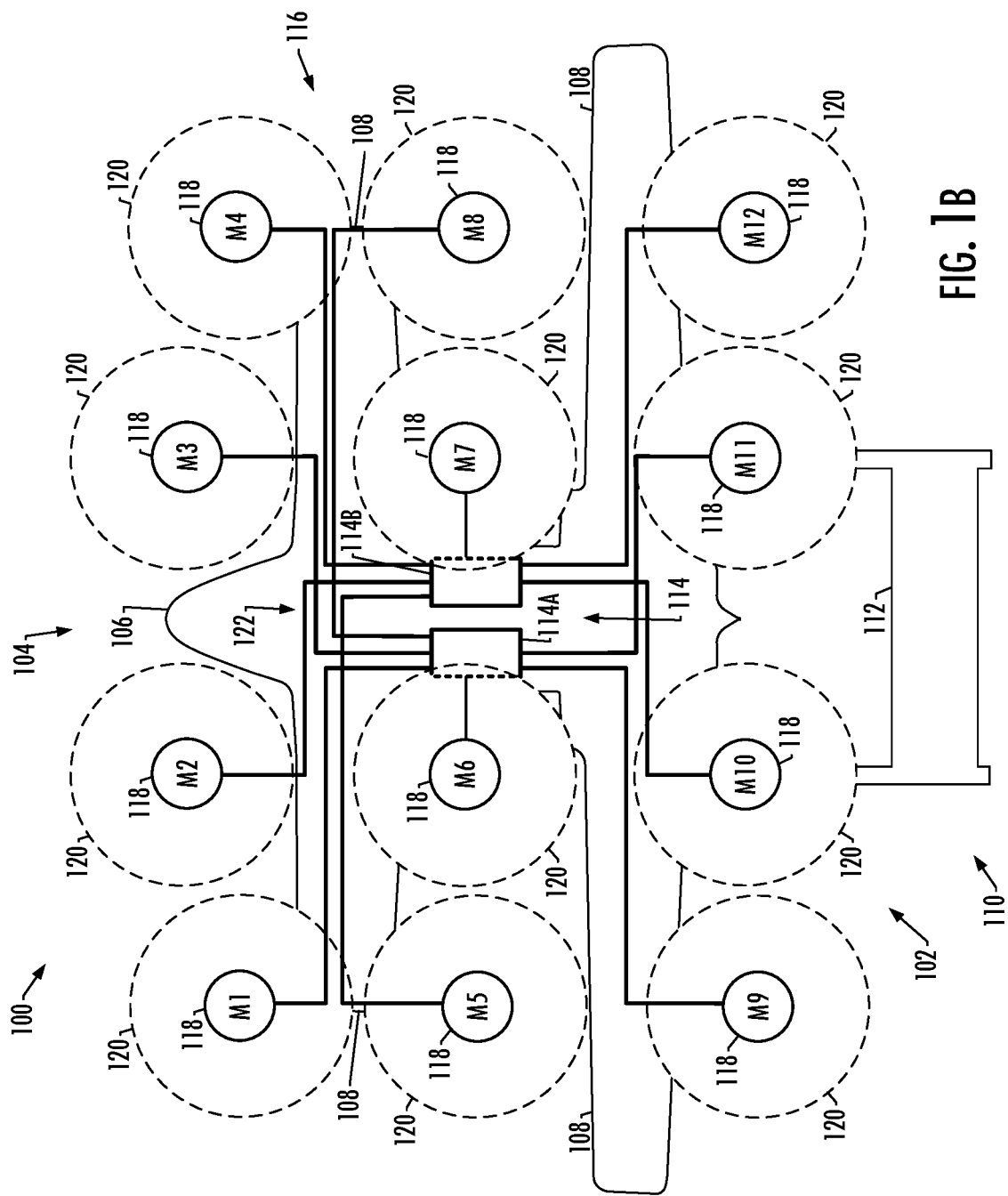

FIGS. 1A and 1B illustrate one type of vehicle 100, namely, an aircraft, that may benefit from example implementations of the present disclosure. As shown, the vehicle generally includes a basic structure 102 with an airframe 104 with including a fuselage 106, and one or more pairs of wings 108 that extend from opposing sides of the fuselage. The airframe also includes an empennage or tail assembly 110 at a rear end of the fuselage, and the tail assembly includes a stabilizer 112.

The vehicle 100 includes a plurality of power sources 114, and a propulsion system 116 including a plurality of electric motors 118 configured to power a plurality of propulsors 120 to generate propulsive forces that cause the vehicle to move. The vehicle as shown includes twelve electric motors (labeled M1-M12), and the propulsors are rotors. Depending on the vehicle, in various examples, the propulsors include one or more of rotors, propellers or wheels. Also in the vehicle as shown, the plurality of electric motors are mounted to the one or more pairs of wings 108, and each wing has multiple ones of the electric motors mounted to the wing. As also shown, power distribution circuitry 122 electrically couples the plurality of power sources to the plurality of electric motors. The power distribution circuitry is configured to deliver electric power from the plurality of power sources to the plurality of electric motors.

Figure 2:
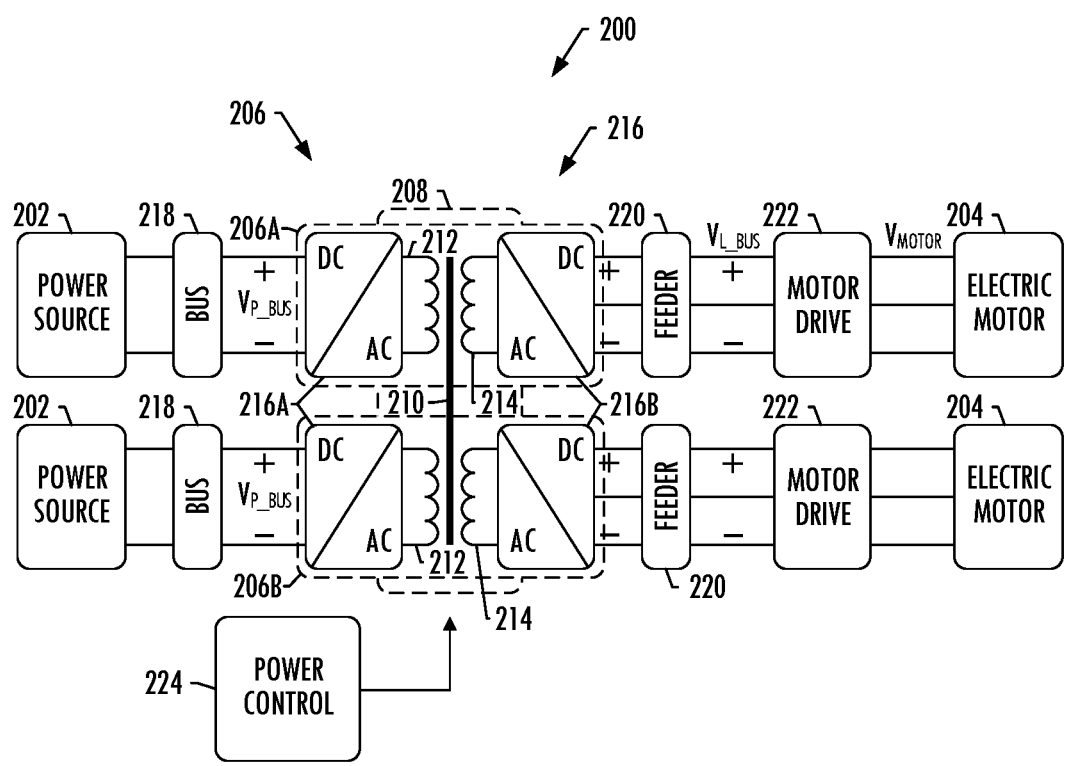
FIG. 2 illustrates power distribution circuitry, according to some example implementations.

FIG. 2 illustrates power distribution circuitry 200 that in some examples may correspond to the power distribution circuitry shown in FIG. 1B. The power distribution circuitry is configured to deliver direct current (DC) electric power from a plurality of power sources 202 to a plurality of electric motors 204, which may correspond to respectively the plurality of power sources 114 and electric motors 118. The power distribution circuitry includes a plurality of DC-to-DC converter assemblies 206 (one shown) configured to input the DC electric power from the plurality of power sources and deliver voltage-regulated outputs to the plurality of electric motors. Each DC-to-DC converter assembly of one or more of the plurality of DC-to-DC converter assemblies is operatively coupled to multiple ones of the plurality of power sources and multiple ones of the plurality of electric motors.

The DC-to-DC converter assembly 206 includes a multiple-input and multiple-output (MIMO) transformer 208 with a single transformer core 210. In some examples, the MIMO transformer further includes multiple primary coils 212 and multiple secondary coils 214 wound around the single transformer core, and isolated from one another but magnetically coupled by the single transformer core. The MIMO transformer with the single transformer core may allow one input to dynamically, seamlessly compensate for a fault or failure that impacts another input. The MIMO transformer may also provide four-terminal (or more) galvanic isolation.

Figure 3:
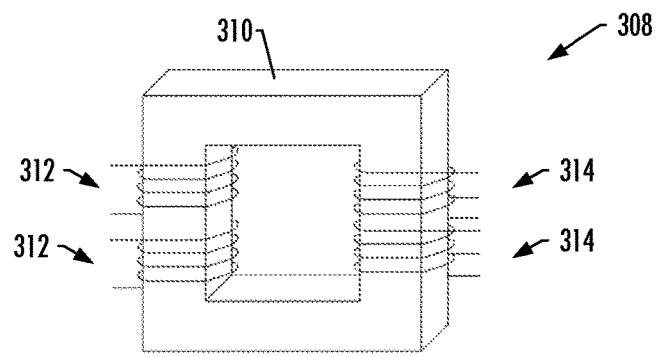
FIGS. 3, 4 and 5 illustrate a multiple-input and multiple-output (MIMO) transformer, according to various example implementations.
Figure 4:
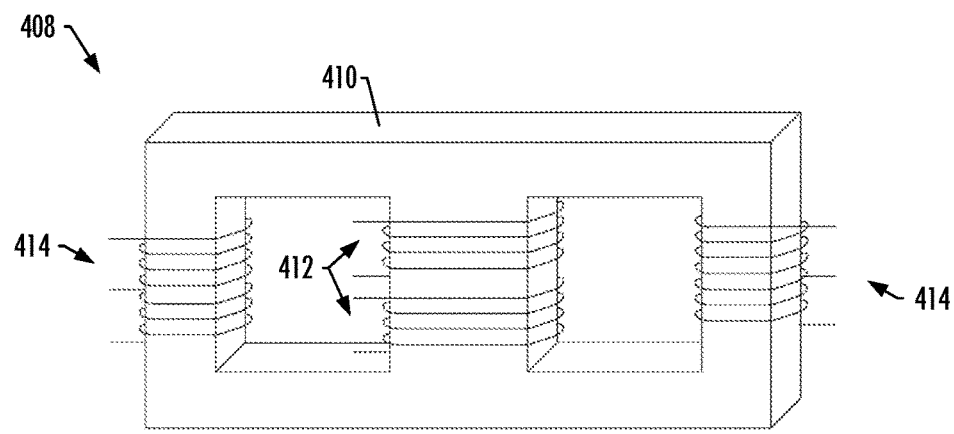
Figure 5:
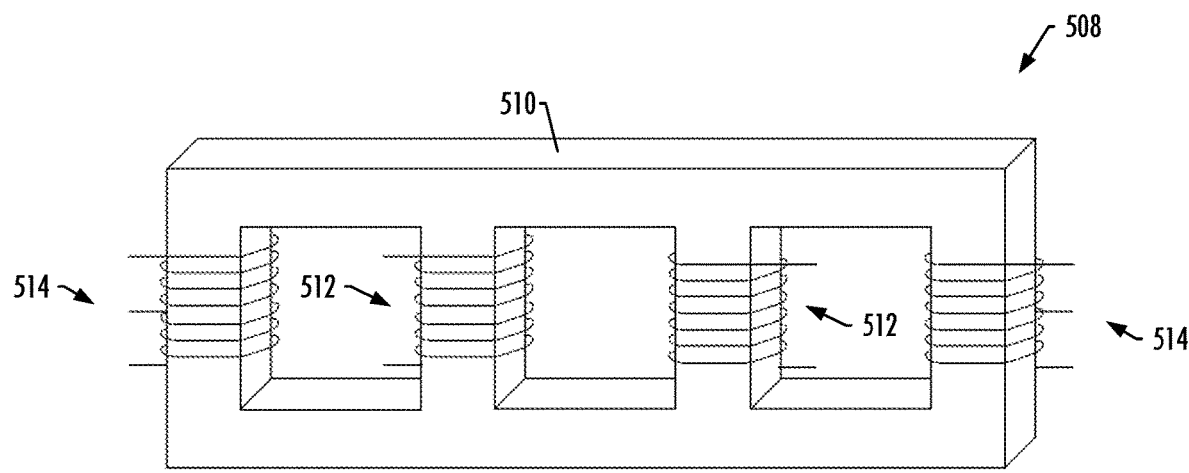

FIGS. 3, 4 and 5 illustrate example implementations of a MIMO transformer 308, 408, 508 that may correspond to the MIMO transformer 208. As shown, MIMO transformer 308 includes multiple primary coils 312 and multiple secondary coils 314 wound around a single transformer core 310. Similarly, MIMO transformer 408 includes multiple primary coils 412 and multiple secondary coils 414 wound around a single transformer core 410. And MIMO transformer 508 includes multiple primary coils 512 and multiple secondary coils 514 wound around a single transformer core 510.

In some examples, the DC-to-DC converter assembly 206 further includes a plurality of high-frequency power converters 216. These high-frequency power converters may be designed to operate with a switching frequency in the range from 20-200 kHz. Examples of suitable high-frequency power converters include high-frequency AC-to-DC converters, DC-to-AC converters and the like. The plurality of high-frequency power converters 216 include a first multiple high-frequency power converters 216A coupled to respective ones of the multiple primary coils 212 of the MIMO transformer 208, and a second multiple high-frequency power converters 216B coupled to respective ones of the secondary coils 214 of the MIMO transformer.

In some examples, the DC-to-DC converter assembly 206 includes a first DC-to-DC converter 206A and a second DC-to-DC converter 206B that share the single transformer core 210. The first DC-to-DC converter and the second DC-to-DC converter may coordinate to manage power throughput. When one of the DC-to-DC converters or the power source coupled to it experiences a fault or failure, the other of the DC-to-DC converters may immediately compensate, leaving output of the DC-to-DC converter assembly minimally impacted.

The first DC-to-DC converter 206A and the second DC-to-DC converter 206B each include a respective one of the multiple primary coils 212, and a respective one of the multiple secondary coils 214, wound around the single transformer coil 210, and isolated from one another but magnetically coupled by the single transformer core. The first DC-to-DC converter and the second DC-to-DC converter also each include a respective one of the first multiple high-frequency power converters 216A, and a respective one of the second multiple high-frequency power converters 216B.

As also shown, power distribution circuitry 200 may include a plurality of electric power buses 218 electrically coupling the plurality of power sources 202 to the DC-to-DC converter assembly 206. A plurality of feeders 220 may electrically couple the DC-to-DC converter assembly to a plurality of motor drives 222 configured to drive the plurality of electric motors 204. Even further, in some examples, the power distribution circuitry may include power control circuitry 224 configured to control at least some of the plurality of high-frequency power converters 216. The power control circuitry may receive appropriate set points, detect states of the first and second DC-to-DC converters 216A, 216B, and control the high-frequency power converters accordingly.

Figure 6:
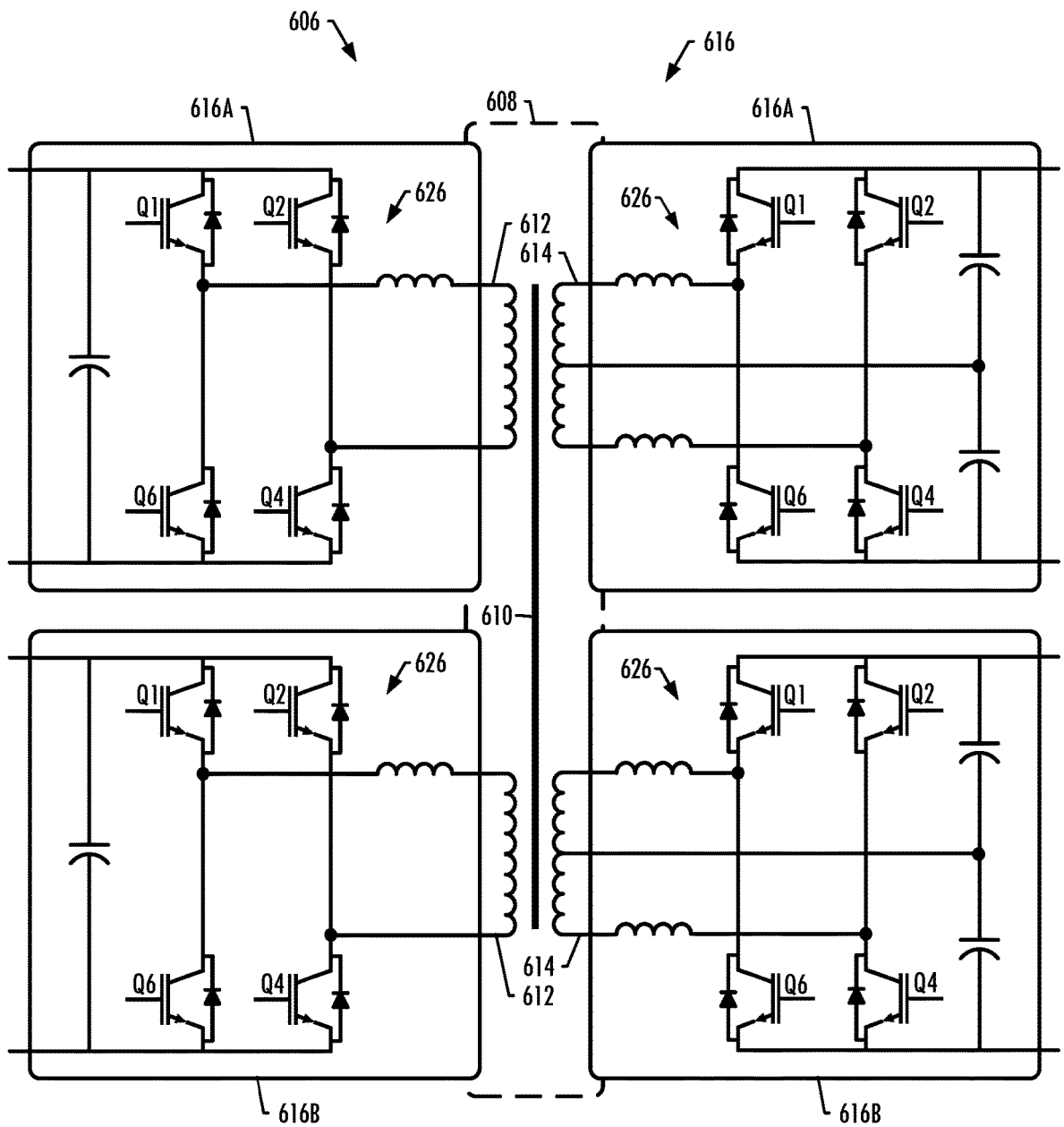
FIG. 6 illustrates a DC-to-DC converter assembly, according to some example implementations.

FIG. 6 illustrates a DC-to-DC converter assembly 606 that in some examples may correspond to DC-to-DC converter assembly 206. As shown, in some examples, at least some of the plurality of high-frequency power converters 616 include bridge circuits 626 with respective switches Q1-Q4. In some of these examples, the power control circuitry 224 is configured to control the respective switches to thereby control power flow through the DC-to-DC converter assembly, and manage magnetic flux through the single transformer core 610.

The power control circuitry 224 configured to manage the magnetic flux may include the control circuitry configured to manage volt-seconds of the single transformer core 610. This may enable the power control circuitry to avoid saturation and recirculating currents when driving the plurality of electric motors 204 from one or more of the plurality of power sources 202, and when power is regenerated to the plurality of power sources. Recirculating currents are DC currents within the MIMO transformer that may result in a number of measurable conditions. One of these conditions may be a DC current measured in the primary and secondary coils 612, 614 that results in asymmetric drive currents detectable cycle-by-cycle. Another of these conditions may be an asymmetry saturation spike that occurs in only one direction pulse-by-pulse. This may be detected by the saturation voltage protection circuits of the respective switches Q1-Q4. Either or both may be implemented to monitor and the opposite asymmetry may be applied to drive waveforms of the respective switches to correct and compensate to manage the recirculation.

In some further examples, the power control circuitry 224 is configured to control the respective switches Q1-Q4 to synchronize the power flow through the DC-to-DC converter assembly 606. In this regard, the power control circuitry may control the respective switches to synchronize timing of switching the respective switches, and an amount of power from respective ones of the plurality of power sources (e.g., power sources 202) through the DC-to-DC converter assembly.

Additionally or alternatively, in some examples, the power control circuitry 224 is configured to control the respective switches Q1-Q4 to control different amounts of power through the DC-to-DC converter assembly 606 simultaneously. In a more particular example, the power control circuitry may be configured to control the respective switches to control different, nonzero amounts of power from the multiple ones of the plurality of power sources 202 through the DC-to-DC converter assembly simultaneously. In this regard, the power control circuitry may favor one or more of the plurality of power sources over others of the plurality of power sources, from 0-100% of the required load.

Figure 7:
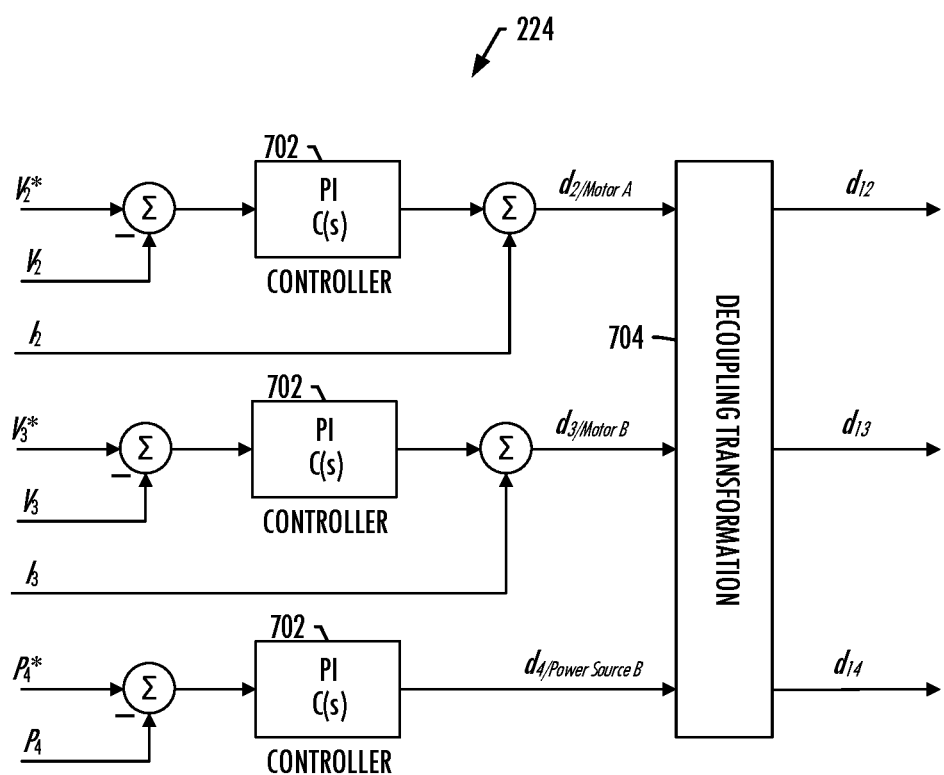
FIG. 7 is a control diagram of power control circuitry, according to some example implementations.

FIG. 7 is a control diagram of the power control circuitry 224 according to some example implementations. As shown, $V_2$ and $V_3$ represent voltage-regulated outputs of the DC-to-DC converter assembly 206 to the plurality of electric motors 204, and $V_2^*$ and $V_3^*$ represent corresponding set point voltages. As also shown, $P_4^*$ represents a percentage (0-100%) of power derived from the input of one of the DC-to-DC converter assemblies (e.g., input to the second DC-to-DC converter 206B). The input of the other of the DC-to-DC converter assemblies (e.g., to the first DC-to-DC converter 206A) may automatically adjust to make up the difference.

More particularly, the power control circuitry 224 may include proportional-integral (PI) controllers 702 and a decoupling transformation 704, and the power control circuitry may be configured to regulate current flow using phase modulation. In this regard, the power control circuitry may be configured to control the respective switches Q1-Q4 to apply a square wave voltage to the MIMO transformer with a phase shift. Depending on the phase shift, a net current flow may be regulated in either direction. The control diagram intermediate outputs $d_{2/Motor\ A}$, $d_{3/Motor\ B}$ and $d_{2/Power\ Source\ B}$ are these phase shifts.

The phase shifts may follow current commands, and may be regulated by the steady-state current draw $I_2$ at the input of the one of the DC-to-DC converter assemblies 206, and an additional 'delta' component determined from the PI controllers 702 that are used to regulate the DC voltage. This way, the delay may be calculated that provides the steady-state direct current to the electric motor 204 and enough 'delta' current to charge a DC bus capacitor on the respective input to the desired voltage. The electric power may be regulated in the same way as the bottom third of the controller shows. Because the power source itself defines the voltage, this control may regulate the power directly to control the share of power from each of the plurality of power sources 202 source to the plurality of electric motors. The decoupling transformation 704 may use a model of the MIMO transformer to convert the individual phase shift delays to delays that account for the interaction between the inputs.

Returning to FIG. 2, in some examples, the power control circuitry 224 is further configured to control the respective switches Q1-Q4 of one or more of the high-frequency power converters 616 to compensate one or more faults or failures. In some of these examples, the power control circuitry is configured to control the respective switches to compensate for a fault or failure at one of the high-frequency power converters 616, or a fault or failure at one of the multiple ones of the plurality of power sources (e.g., power sources 202) operatively coupled to the DC-to-DC converter assembly 606. In this regard, the power control circuitry may open the respective switches of the one of the high-frequency power converters with the fault or failure, or operatively coupled to the one of the plurality of power sources with the fault or failure, which may disable the one of the high-frequency power converters.

Figure 8:
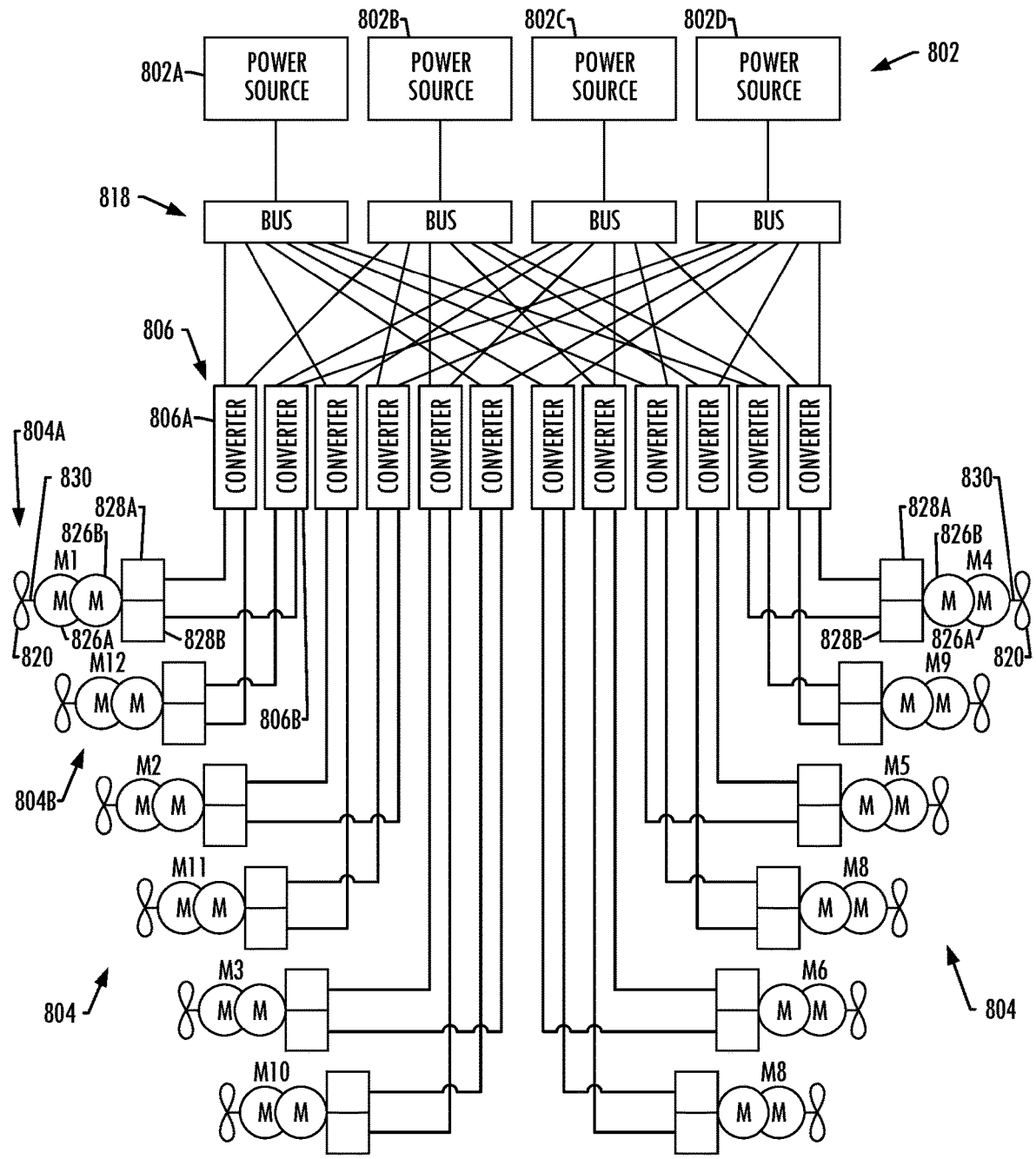
FIGS. 8, 9 and 10 illustrates power distribution circuitry, according to various example implementations.

FIG. 8 illustrates power distribution circuitry 800 according to some examples. The power control circuitry may correspond to power distribution circuitry 200, including a plurality of DC-to-DC converter assemblies 806 that may correspond to DC-to-DC converter assemblies 206. The DC-to-DC converter assembly includes a first DC-to-DC converter 806A and a second DC-to-DC converter 806B that may correspond to respectively the first DC-to-DC converter 206A and the second DC-to-DC converter 206B. The power distribution circuitry is configured to deliver DC electric power from a plurality of power sources 802 to a plurality of electric motors 804 (twelve shown as M1-M12), which may correspond to respectively the plurality of power sources 202 and electric motors 204. And the power distribution circuitry includes a plurality of electric power buses 818 that may correspond to the plurality of electric power buses 218.

As shown in FIG. 8, in some examples, each electric motor 804 has dual armature windings 826A, 826B (two pairs of which are called out in the figure). These dual armature windings (e.g., three-phase armature windings) are driven by dual, independent motor drives 828A, 828B to develop a magnetic field to provide torque to rotate a motor shaft 830 that causes a respective one of the plurality of propulsors 120, 820 to generate a propulsive force.

In some of these examples, the DC-to-DC converter assembly 806 includes the first DC-to-DC converter 806A configured to deliver first voltage-regulated outputs to a first of the dual, independent motor drives 828A and thereby a first of the dual armature windings 826A of a first and a second of the plurality of electric motors 804A, 804B. Similarly, the second DC-to-DC converter 806B is configured to deliver second voltage-regulated outputs to a second of the dual, independent motor drives 828B and thereby a second of the dual armature windings 826B of the first and the second of the electric motors 804A, 804B.

In some examples, the first DC-to-DC converter 806A is configured to input the DC electric power from a first and a second of the plurality of power sources 802A, 802B. In some of these examples, the second DC-to-DC converter 806B is configured to input the DC electric power from a third and a fourth of the plurality of power sources 802C, 802D. In other of these examples, the second DC-to-DC converter is configured to input the DC electric power from the first or the second of the plurality of power sources, and the third of the plurality of power sources.

Figure 9:
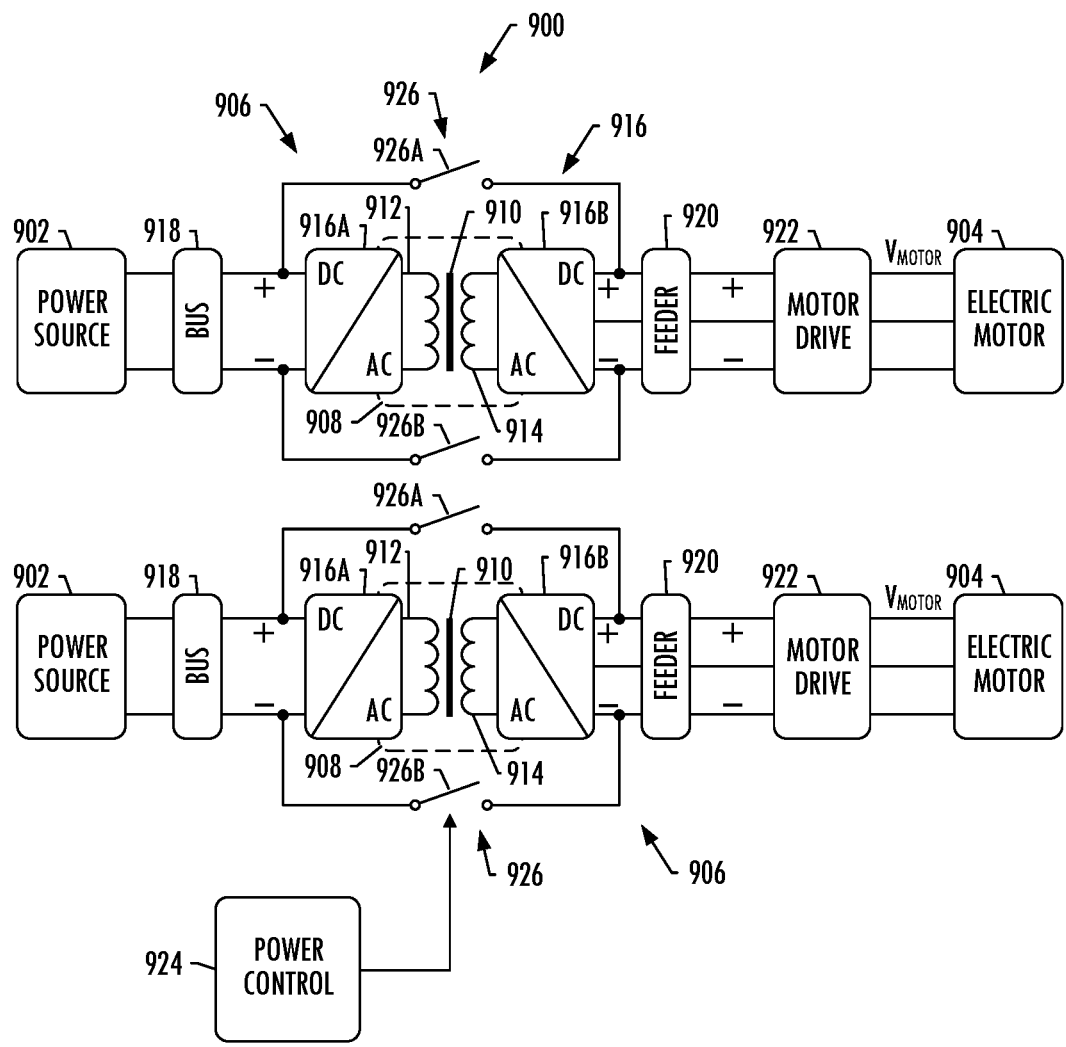
Figure 10:
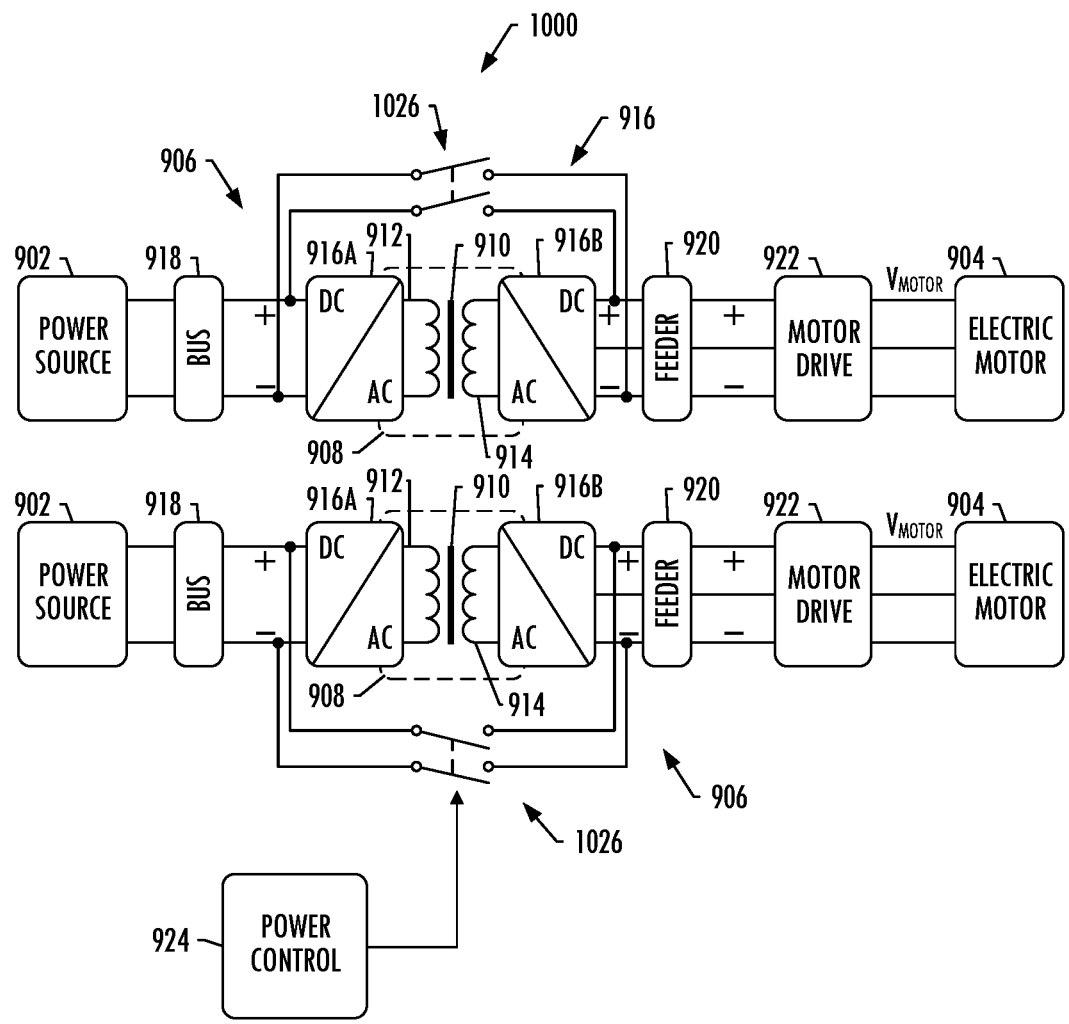

FIGS. 9 and 10 illustrate power distribution circuitry 900, 1000 that in various examples may correspond to the power distribution circuitry shown in FIG. 1B. The power distribution circuitry is configured to deliver DC electric power from a plurality of power sources 902 to a plurality of electric motors 904, which may correspond to respectively the plurality of power sources 114 and electric motors 118. The power distribution circuitry includes a plurality of DC-to-DC converters 906 configured to input the DC electric power from the plurality of power sources and deliver voltage-regulated outputs to the plurality of electric motors.

In some examples, the DC-to-DC converter 906 includes a transformer 908 including a primary coil 912 and a secondary coil 914 wound around a transformer core 910, and isolated from one another but magnetically coupled by the transformer core. In some examples, the DC-to-DC converter also includes a plurality of high-frequency power converters 916 including a first high-frequency power converter 916A coupled to the primary coil 912 of the transformer 908, and a second high-frequency power converter 916B coupled to the secondary coil 914 of the transformer. Similar to above, these high-frequency power converters may be designed to operate with a switching frequency in the range from 20-200 kHz. Examples of suitable high-frequency power converters include high-frequency AC-to-DC converters, DC-to-AC converters and the like.

The power distribution circuitry 900 may also include a plurality of electric power buses 918 electrically coupling the plurality of power sources 902 to the DC-to-DC converter assembly 906. A plurality of feeders 920 may electrically couple the DC-to-DC converter assembly to a plurality of motor drives 922 configured to drive the plurality of electric motors 904. Even further, in some examples, the power distribution circuitry may include power control circuitry 924 configured to control at least some of the plurality of high-frequency power converters 916.

As further shown, in some examples, the power distribution circuitry includes a plurality of bypass switches 926, 1026 connected in parallel with respective ones of the plurality of DC-to-DC converters 906. In some of these examples, the power control circuitry 924 is configured to control a bypass switch to circumvent a DC-to-DC converter, responsive to a fault or failure at the DC-to-DC converter.

In some examples, the DC-to-DC converter 906 has inputs including a positive input (+) and a negative input (−), and outputs including a positive output (+) and a negative output (−). In some of these examples, as shown more particularly in FIG. 9, the bypass switch 926 includes a single pole switch pair 926A, 926B that connects the positive input to the positive output, and connects the negative input to the negative output. In others of these examples, as shown more particularly in FIG. 10, the bypass switch 1026 includes a double pole switch that connects the positive input to the positive output, and connects the negative input to the negative output.

Returning to FIG. 8, in some examples, power distribution circuitry 800 corresponds to power distribution circuitry 900, 1000 including a plurality of DC-to-DC converters (first and second DC-to-DC converters 806A, 806B) that may correspond to DC-to-DC converters 906. The power distribution circuitry is configured to deliver DC electric power from the plurality of power sources 802 to the plurality of electric motors 804, which may correspond to respectively the plurality of power sources 902 and electric motors 904. And the power distribution circuitry includes a plurality of electric power buses 818 that may correspond to the plurality of electric power buses 918.

In some of the above examples, each electric motor 804 has dual armature windings 826A, 826B driven by the dual, independent motor drives 828A, 828B to develop a magnetic field to provide torque to rotate the motor shaft 830 that causes a respective one of the plurality of propulsors 820, as described above. And in some of these examples, each of the dual, independent motor drives and thereby the dual armature windings of an electric motor is powered from a different one of the plurality of power sources 802.

In some example implementations of the present disclosure, one or more of the transformers 208, 308, 408, 508, 608, 908 may be an isolation transformer to provide some measure of arc flash protection. In this regard, an arc flash is the light and heat produced as part of an arc fault that results from an electrical connection through air to ground or another voltage phase in an electrical system. An arc rating may be expressed in calories of heat energy per square centimeter, which is dependent on variables of working voltage, bolted short-circuit current, over-current protection device clearing time and the like. In some example implementations of the present disclosure in which the transformer is an isolation transformer, an output of the transformer may see a limited capability for arc flash capacity because an isolation transformer greatly restricts the bolted short circuit current, and any fault current is sourced from an output capacitor, with a much reduced incident energy capacity. In this way, an isolated power converter may provide a means to reduce regulation clearances for arc flash protection.

FIGS. 11A-11J are flowcharts illustrating various steps in a method 1100 of managing power in a vehicle 100, according to various example implementations. The method includes providing the vehicle including a plurality of power sources 114, 202, a propulsion system 116, and power distribution circuitry 122, as shown at block 1102 of FIG. 11A. The propulsion system 116 includes a plurality of electric motors 118, 204 configured to power a plurality of propulsors 120 to generate propulsive forces that cause the vehicle to move, and the power distribution circuitry 122, 200 electrically couples the plurality of power sources to the plurality of propulsors.

The method 1100 also includes delivering direct current (DC) electric power from the plurality of power sources 114, 202 to the plurality of electric motors 118, 204 via the power distribution circuitry 122, 200, as shown at block 1104. The power distribution circuitry includes a plurality of DC-to-DC converter assemblies 206 inputting the DC electric power from the plurality of power sources and delivering voltage-regulated outputs to the plurality of electric motors, as shown at blocks 1106 and 1108. In this regard, a DC-to-DC converter assembly is operatively coupled to multiple ones of the plurality of power sources and multiple ones of the plurality of electric motors, and the DC-to-DC converter assembly includes a MIMO transformer 208 with a single transformer core 210.

Figure 11A:
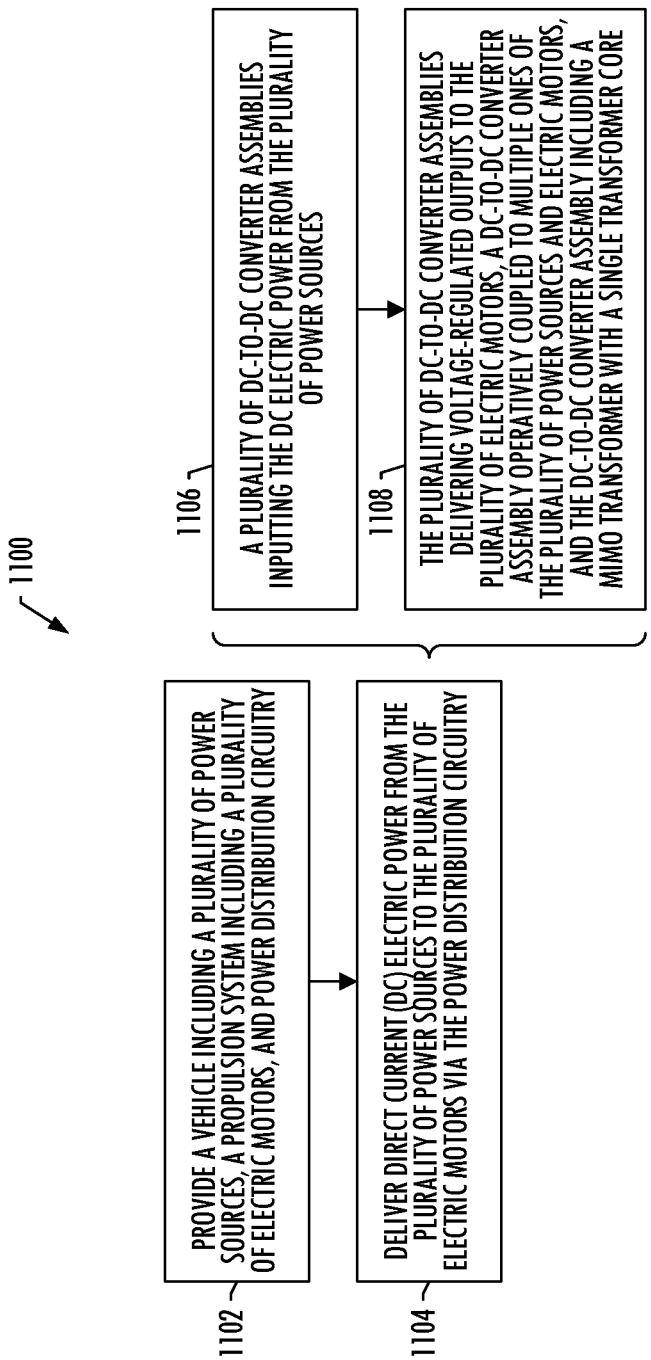
FIGS. 11A, 11B, 11C, 11D, 11E, 11F, 11G, 11H, 11I and 11J are flowcharts illustrating various steps in a method of managing power in a vehicle, according to various example implementations.
Figure 11B:
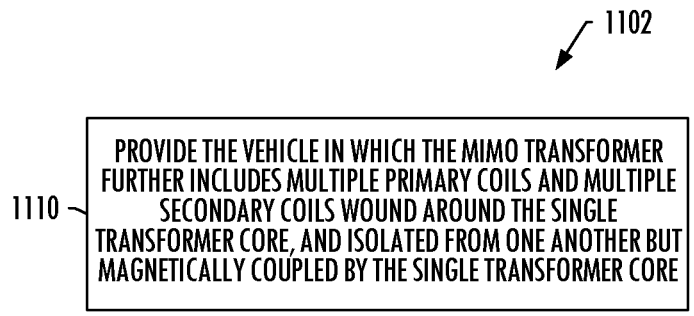

In some examples, providing the vehicle 100 at block 1102 includes providing the vehicle in which the MIMO transformer 208 further includes multiple primary coils 212 and multiple secondary coils 214 wound around the single transformer core 210, and isolated from one another but magnetically coupled by the single transformer core, as shown at block 1110 of FIG. 11B.

Figure 11C:
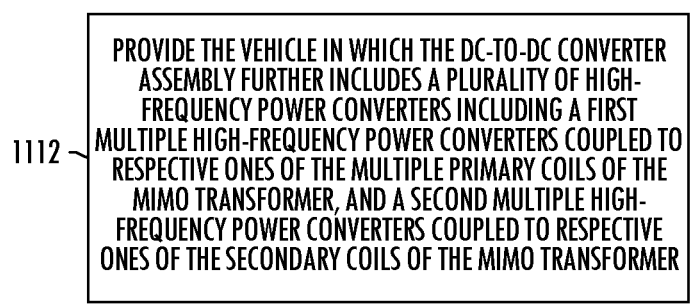

In some further examples, providing the vehicle 100 at block 1110 includes providing the vehicle in which the DC-to-DC converter assembly further includes a plurality of high-frequency power converters 216, 616, as shown at block 1112 of FIG. 11C. In some of these examples, the plurality of high-frequency power converters includes a first multiple high-frequency power converters 216A, 616A coupled to respective ones of the multiple primary coils 212, 612 of the MIMO transformer 208, 608, and a second multiple high-frequency power converters 216B, 616B coupled to respective ones of the secondary coils 214, 614 of the MIMO transformer.

Figure 11D:
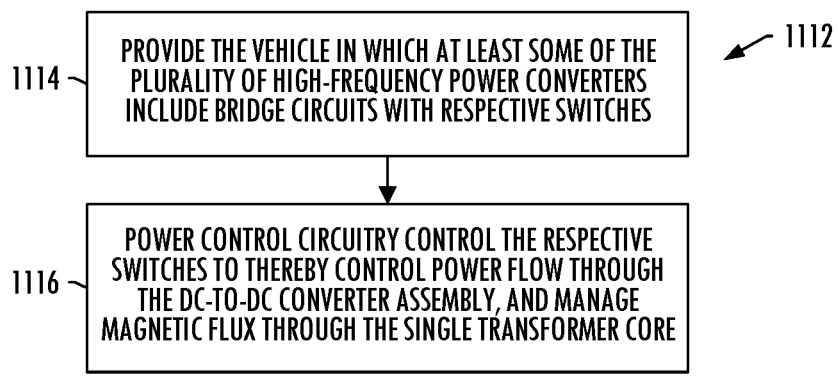

In some even further examples, providing the vehicle 100 at block 1112 includes providing the vehicle in which at least some of the plurality of high-frequency power converters 216, 616 include bridge circuits 626 with respective switches Q1-Q4, as shown at block 1114 of FIG. 11D. In some of these examples, the power distribution circuitry 122, 200 further includes power control circuitry 224, and the method further includes the power control circuitry controlling the respective switches to thereby control power flow through the DC-to-DC converter assembly 206, 606, and manage magnetic flux through the single transformer core 210, 610, as shown at block 1116.

Figure 11E:
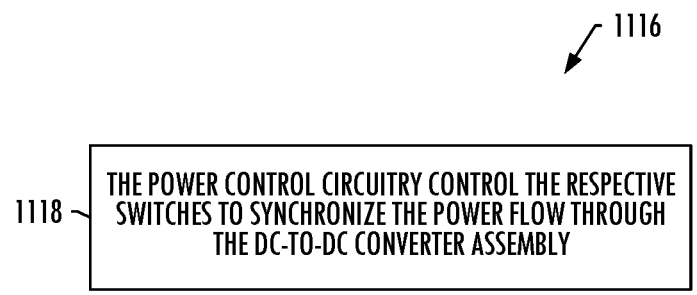

In some examples, controlling the respective switches at block 1116 includes the power control circuitry 224 controlling the respective switches Q1-Q4 to synchronize the power flow through the DC-to-DC converter assembly 206, 606, as shown at block 1118 of FIG. 11E.

Figure 11F:
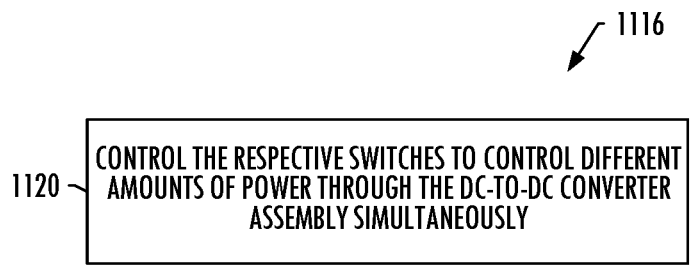

In some examples, controlling the respective switches at block 1116 includes the power control circuitry 224 controlling the respective switches Q1-Q4 to control different amounts of power through the DC-to-DC converter assembly 206, 606 simultaneously, as shown at block 1120 of FIG. 11F.

Figure 11G:
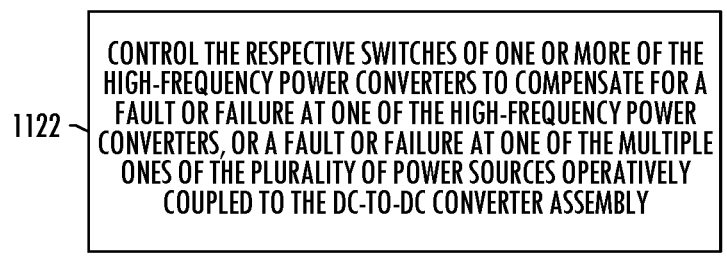

In some examples, the method 1100 further includes the power control circuitry 224 controlling the respective switches Q1-Q4 of one or more of the high-frequency power converters 216, 616 to compensate for a fault or failure at one of the high-frequency power converters, or a fault or failure at one of the multiple ones of the plurality of power sources 114, 202 operatively coupled to the DC-to-DC converter assembly 206, 606, as shown at block 1122 of FIG. 11G.

Figure 11H:
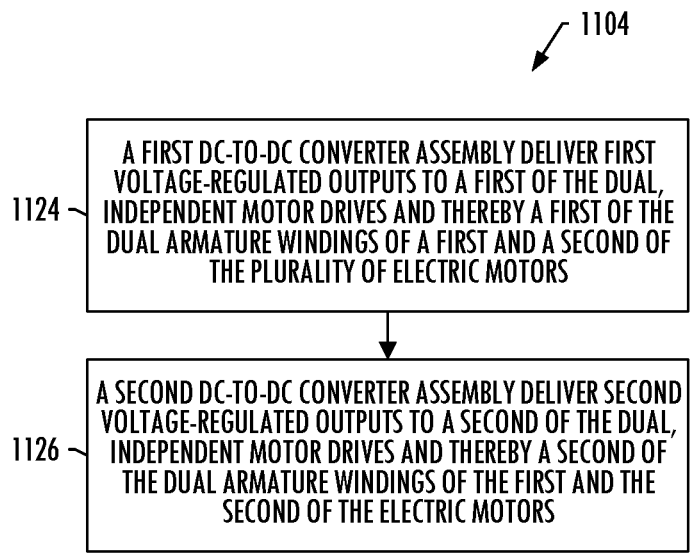

Turning to FIG. 11H, in some examples, each electric motor 118, 204, 804 has dual armature windings 826A, 826B driven by dual, independent motor drives 828A, 828B to develop a magnetic field to provide torque to rotate a motor shaft 830 that causes a respective one of the plurality of propulsors 120, 820 to generate a propulsive force. In some of these examples, the DC-to-DC converter assembly 206, 806 delivering the voltage-regulated outputs at block 1104 includes a first DC-to-DC converter 806A delivering first voltage-regulated outputs to a first of the dual, independent motor drives 828A and thereby a first of the dual armature windings 826A of a first and a second of the plurality of electric motors 804A, 804B, as shown at block 1124. Similarly, a second DC-to-DC converter 806B delivers second voltage-regulated outputs to a second of the dual, independent motor drives 828B and thereby a second of the dual armature windings 826B of the first and the second of the electric motors 804A, 804B, as shown at block 1126.

Figure 11I:
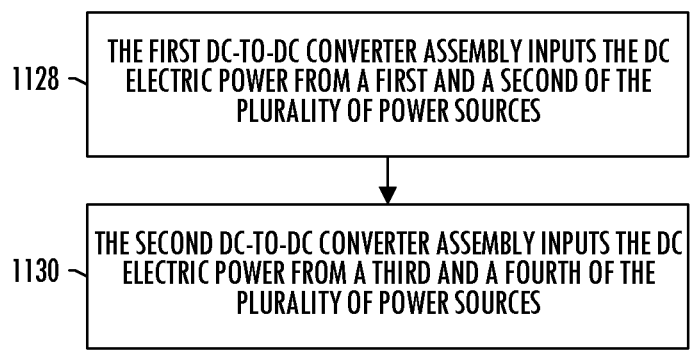

In some further examples, the first DC-to-DC converter 806A inputs the DC electric power from a first and a second of the plurality of power sources 802A, 802B, and the second DC-to-DC converter 806B inputs the DC electric power from a third and a fourth of the plurality of power sources 802C, 802D, as shown at blocks 1128 and 1130 of FIG. 11I.

Figure 11J:
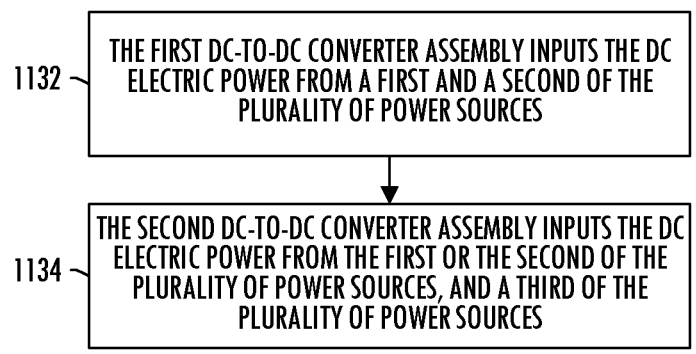

In some examples, the first DC-to-DC converter 806A inputs the DC electric power from a first and a second of the plurality of power sources 802A, 802B, and the second DC-to-DC converter 806B inputs the DC electric power from the first or the second of the plurality of power sources 802A, 802B, and a third of the plurality of power sources 802C, as shown at blocks 1132 and 1134 of FIG. 11J.

FIGS. 12A-12E are also flowcharts illustrating various steps in a method 1200 of managing power in a vehicle 100, according to various example implementations. The method includes providing the vehicle including a plurality of power sources 114, 902, a propulsion system 116, and power distribution circuitry 122, 900, 1000, as shown at block 1202 of FIG. 12A. The propulsion system includes a plurality of electric motors 118, 904 configured to power a plurality of propulsors 120 to generate propulsive forces that cause the vehicle to move, and the power distribution circuitry electrically couples the plurality of power sources to the plurality of propulsors The method 1200 also includes delivering direct current (DC) electric power from the plurality of power sources 114, 902 to the plurality of electric motors 118, 904 via the power distribution circuitry 122, 900, 1000, as shown at block 1204. The power distribution circuitry includes a plurality of DC-to-DC converters 906 inputting the DC electric power from the plurality of power sources and delivering voltage-regulated outputs to the plurality of electric motors, as shown at blocks 1206 and 1208. The power distribution circuitry also includes a plurality of bypass switches 926, 1026 connected in parallel with respective ones of the plurality of DC-to-DC converters, and power control circuitry 924 controlling a bypass switch to circumvent a DC-to-DC converter, responsive to a fault or failure at the DC-to-DC converter, as shown at block 1210.

In some examples, providing 1202 the vehicle 100 at block 1202 includes providing the vehicle in which the DC-to-DC converter 906 includes a transformer 908 and a plurality of high-frequency power converters 916, as shown at block 1212 of FIG. 12B. The transformer 908 includes a primary coil 912 and a secondary coil 914 wound around a transformer core 910, and isolated from one another but magnetically coupled by the transformer core. And the plurality of high-frequency power converters 916 includes a first high-frequency power converter 916A coupled to the primary coil of the transformer, and a second high-frequency power converter 916B coupled to the secondary coil of the transformer.

Figure 12C:
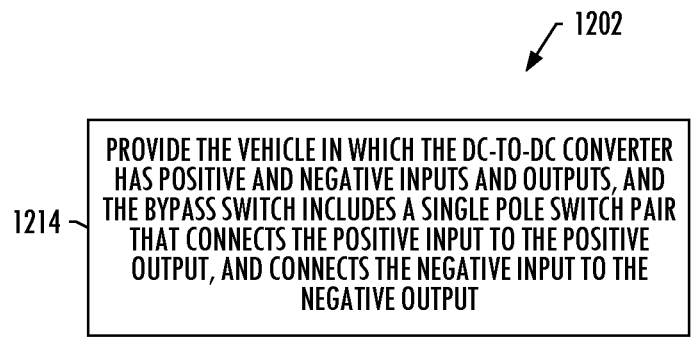
Figure 12D:
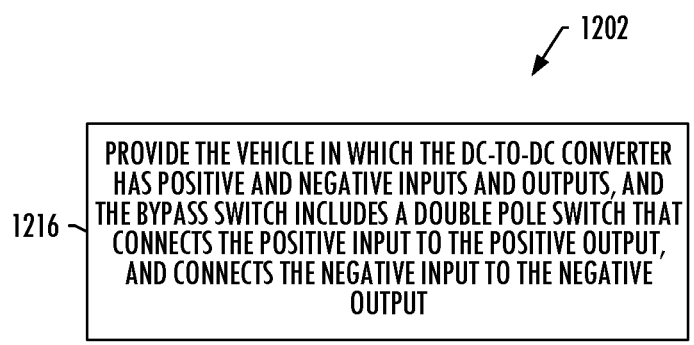

In some examples, providing the vehicle 100 at block 1202 includes providing the vehicle in which the DC-to-DC converter 906 has inputs including a positive input (+) and a negative input (−), and outputs including a positive output (+) and a negative output (−), as shown at block 1214 of FIG. 12C. In some of these examples, the bypass switch 926 includes a single pole switch pair 926A, 926B that connects the positive input to the positive output, and connects the negative input to the negative output. In others of these examples, the bypass switch 1026 includes a double pole switch that connects the positive input to the positive output, and connects the negative input to the negative output, as shown at block 1216 of FIG. 12D.

Figure 12E:
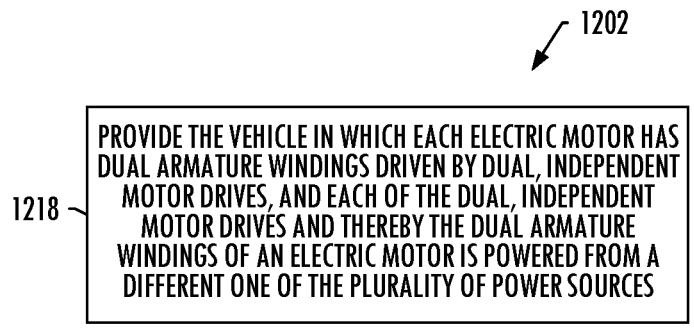

In some examples, providing 1202 the vehicle 100 at block 1202 includes providing the vehicle in which each electric motor 118, 804, 904 has dual armature windings 826A, 826B driven by dual, independent motor drives 828A, 828B to develop a magnetic field to provide torque to rotate a motor shaft 830 that causes a respective one of the plurality of propulsors 120, 820 to generate a propulsive force, as shown at block 1218 of FIG. 12E. In some of these examples, each of the dual, independent motor drives and thereby the dual armature windings of an electric motor is powered from a different one of the plurality of power sources 114, 802.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A vehicle comprising:
a basic structure; and coupled to the basic structure,
a plurality of power sources;
a propulsion system including a plurality of electric motors configured to power a plurality of propulsors to generate propulsive forces that cause the vehicle to move; and
power distribution circuitry configured to deliver direct current (DC) electric power from the plurality of power sources to the plurality of electric motors, the power distribution circuitry including a plurality of DC-to-DC converter assemblies configured to input the DC electric power from the plurality of power sources and deliver voltage-regulated outputs to the plurality of electric motors, a DC-to-DC converter assembly operatively coupled to multiple ones of the plurality of power sources and multiple ones of the plurality of electric motors, and the DC-to-DC converter assembly including a multiple-input and multiple-output (MIMO) transformer with a single transformer core.

2. The vehicle of claim 1, wherein the plurality of propulsors include one or more of rotors, propellers or wheels.

3. The vehicle of claim 1, wherein the MIMO transformer further includes multiple primary coils and multiple secondary coils wound around the single transformer core, and isolated from one another but magnetically coupled by the single transformer core.

4. The vehicle of claim 3, wherein the DC-to-DC converter assembly further includes a plurality of high-frequency power converters including a first multiple high-frequency power converters coupled to respective ones of the multiple primary coils of the MIMO transformer, and a second multiple high-frequency power converters coupled to respective ones of the secondary coils of the MIMO transformer.

5. The vehicle of claim 4, wherein at least some of the plurality of high-frequency power converters include bridge circuits with respective switches, and
wherein the power distribution circuitry further includes power control circuitry configured to control the respective switches to thereby control power flow through the DC-to-DC converter assembly, and manage magnetic flux through the single transformer core.

6. The vehicle of claim 5, wherein the power control circuitry is configured to control the respective switches to synchronize the power flow through the DC-to-DC converter assembly.

7. The vehicle of claim 5, wherein the power control circuitry is configured to control the respective switches to control different amounts of power through the DC-to-DC converter assembly simultaneously.

8. The vehicle of claim 5, wherein the power control circuitry is further configured to control the respective switches of one or more of the high-frequency power converters to compensate for a fault or failure at one of the high-frequency power converters, or a fault or failure at one of the multiple ones of the plurality of power sources operatively coupled to the DC-to-DC converter assembly.

9. The vehicle of claim 1, wherein each electric motor has dual armature windings driven by dual, independent motor drives to develop a magnetic field to provide torque to rotate a motor shaft that causes a respective one of the plurality of propulsors to generate a propulsive force, and the DC-to-DC converter assembly includes at least:
a first DC-to-DC converter configured to deliver first voltage-regulated outputs to a first of the dual, independent motor drives and thereby a first of the dual armature windings of a first and a second of the plurality of electric motors; and
a second DC-to-DC converter configured to deliver second voltage-regulated outputs to a second of the dual, independent motor drives and thereby a second of the dual armature windings of the first and the second of the electric motors.

10. The vehicle of claim 9, wherein the first DC-to-DC converter is configured to input the DC electric power from a first and a second of the plurality of power sources, and the second DC-to-DC converter is configured to input the DC electric power from a third and a fourth of the plurality of power sources.

11. The vehicle of claim 9, wherein the first DC-to-DC converter is configured to input the DC electric power from a first and a second of the plurality of power sources, and the second DC-to-DC converter is configured to input the DC electric power from the first or the second of the plurality of power sources, and a third of the plurality of power sources.

12. A method of managing power in a vehicle, the method comprising:
providing the vehicle including a plurality of power sources, a propulsion system including a plurality of electric motors configured to power a plurality of propulsors to generate propulsive forces that cause the vehicle to move, and power distribution circuitry electrically coupling the plurality of power sources to the plurality of propulsors; and
delivering direct current (DC) electric power from the plurality of power sources to the plurality of electric motors via the power distribution circuitry that includes a plurality of DC-to-DC converter assemblies inputting the DC electric power from the plurality of power sources and delivering voltage-regulated outputs to the plurality of electric motors, a DC-to-DC converter assembly operatively coupled to multiple ones of the plurality of power sources and multiple ones of the plurality of electric motors, and the DC-to-DC converter assembly including a multiple-input and multiple-output (MIMO) transformer with a single transformer core.

13. The method of claim 12, wherein providing the vehicle includes providing the vehicle in which the MIMO transformer further includes multiple primary coils and multiple secondary coils wound around the single transformer core, and isolated from one another but magnetically coupled by the single transformer core.

14. The method of claim 13, wherein providing the vehicle includes providing the vehicle in which the DC-to-DC converter assembly further includes a plurality of high-frequency power converters including a first multiple high-frequency power converters coupled to respective ones of the multiple primary coils of the MIMO transformer, and a second multiple high-frequency power converters coupled to respective ones of the secondary coils of the MIMO transformer.

15. The method of claim 14, wherein providing the vehicle includes providing the vehicle in which at least some of the plurality of high-frequency power converters include bridge circuits with respective switches, and
wherein the power distribution circuitry further includes power control circuitry, and the method further comprises the power control circuitry controlling the respective switches to thereby control power flow through the DC-to-DC converter assembly, and manage magnetic flux through the single transformer core.

16. The method of claim 15, wherein controlling the respective switches includes the power control circuitry controlling the respective switches to synchronize the power flow through the DC-to-DC converter assembly.

17. The method of claim 15, wherein controlling the respective switches includes the power control circuitry controlling the respective switches to control different amounts of power through the DC-to-DC converter assembly simultaneously.

18. The method of claim 15, wherein the method further comprises the power control circuitry controlling the respective switches of one or more of the high-frequency power converters to compensate for a fault or failure at one of the high-frequency power converters, or a fault or failure at one of the multiple ones of the plurality of power sources operatively coupled to the DC-to-DC converter assembly.

19. The method of claim 12, wherein each electric motor has dual armature windings driven by dual, independent motor drives to develop a magnetic field to provide torque to rotate a motor shaft that causes a respective one of the plurality of propulsors to generate a propulsive force, and the DC-to-DC converter assembly delivering the voltage-regulated outputs includes at least:
a first DC-to-DC converter delivering first voltage-regulated outputs to a first of the dual, independent motor drives and thereby a first of the dual armature windings of a first and a second of the plurality of electric motors; and
a second DC-to-DC converter delivering second voltage-regulated outputs to a second of the dual, independent motor drives and thereby a second of the dual armature windings of the first and the second of the electric motors.

20. The method of claim 19, wherein the first DC-to-DC converter inputs the DC electric power from a first and a second of the plurality of power sources, and the second DC-to-DC converter inputs the DC electric power from a third and a fourth of the plurality of power sources.

21. The method of claim 19, wherein the first DC-to-DC converter inputs the DC electric power from a first and a second of the plurality of power sources, and the second DC-to-DC converter inputs the DC electric power from the first or the second of the plurality of power sources, and a third of the plurality of power sources.

22. A vehicle comprising:
a basic structure; and coupled to the basic structure,
a plurality of power sources;
a propulsion system including a plurality of electric motors configured to power a plurality of propulsors to generate propulsive forces that cause the vehicle to move; and
power distribution circuitry configured to deliver direct current (DC) electric power from the plurality of power sources to the plurality of electric motors, the power distribution circuitry including:
  a plurality of DC-to-DC converters configured to input the DC electric power from the plurality of power sources and deliver voltage-regulated outputs to the plurality of electric motors;
  a plurality of bypass switches connected in parallel with respective ones of the plurality of DC-to-DC converters; and
  power control circuitry configured to control a bypass switch to circumvent a DC-to-DC converter, responsive to a fault or failure at the DC-to-DC converter.

23. The vehicle of claim 22, wherein the plurality of propulsors include one or more of rotors, propellers or wheels.

24. The vehicle of claim 22, wherein the DC-to-DC converter includes:
  a transformer including a primary coil and a secondary coil wound around a transformer core, and isolated from one another but magnetically coupled by the transformer core; and
  a plurality of high-frequency power converters including a first high-frequency power converter coupled to the primary coil of the transformer, and a second high-frequency power converter coupled to the secondary coil of the transformer.

25. The vehicle of claim 22, wherein the DC-to-DC converter has inputs including a positive input and a negative input, and outputs including a positive output and a negative output, and the bypass switch includes a single pole switch pair that connects the positive input to the positive output, and connects the negative input to the negative output.

26. The vehicle of claim 22, wherein the DC-to-DC converter has inputs including a positive input and a negative input, and outputs including a positive output and a negative output, and the bypass switch includes a double pole switch that connects the positive input to the positive output, and connects the negative input to the negative output.

27. The vehicle of claim 22, wherein each electric motor has dual armature windings driven by dual, independent motor drives to develop a magnetic field to provide torque to rotate a motor shaft that causes a respective one of the plurality of propulsors to generate a propulsive force, and each of the dual, independent motor drives and thereby the dual armature windings of an electric motor is powered from a different one of the plurality of power sources.

28. A method of managing power in a vehicle, the method comprising:
  providing the vehicle including a plurality of power sources, a propulsion system including a plurality of electric motors configured to power a plurality of propulsors to generate propulsive forces that cause the vehicle to move, and power distribution circuitry electrically coupling the plurality of power sources to the plurality of propulsors; and
  delivering direct current (DC) electric power from the plurality of power sources to the plurality of electric motors via the power distribution circuitry that includes:
    a plurality of DC-to-DC converters inputting the DC electric power from the plurality of power sources and delivering voltage-regulated outputs to the plurality of electric motors;
    a plurality of bypass switches connected in parallel with respective ones of the plurality of DC-to-DC converters; and
    power control circuitry controlling a bypass switch to circumvent a DC-to-DC converter, responsive to a fault or failure at the DC-to-DC converter.

29. The method of claim 28, wherein providing the vehicle includes providing the vehicle in which the DC-to-DC converter includes:
  a transformer including a primary coil and a secondary coil wound around a transformer core, and isolated from one another but magnetically coupled by the transformer core; and
  a plurality of high-frequency power converters including a first high-frequency power converter coupled to the primary coil of the transformer, and a second high-frequency power converter coupled to the secondary coil of the transformer.

30. The method of claim 28, wherein providing the vehicle includes providing the vehicle in which the DC-to-DC converter has inputs including a positive input and a negative input, and outputs including a positive output and a negative output, and the bypass switch includes a single pole switch pair that connects the positive input to the positive output, and connects the negative input to the negative output.

31. The method of claim 28, wherein providing the vehicle includes providing the vehicle in which the DC-to-DC converter has inputs including a positive input and a negative input, and outputs including a positive output and a negative output, and the bypass switch includes a double pole switch that connects the positive input to the positive output, and connects the negative input to the negative output.

32. The method of claim 28, wherein providing the vehicle includes providing the vehicle in which each electric motor has dual armature windings driven by dual, independent motor drives to develop a magnetic field to provide torque to rotate a motor shaft that causes a respective one of the plurality of propulsors to generate a propulsive force, and each of the dual, independent motor drives and thereby the dual armature windings of an electric motor is powered from a different one of the plurality of power sources.

* * * * *